(Model.)
P. DROZ-JEANNOT, FILS.
Stem Winding Watch.
No. 233,336. Patented Oct. 19, 1880.
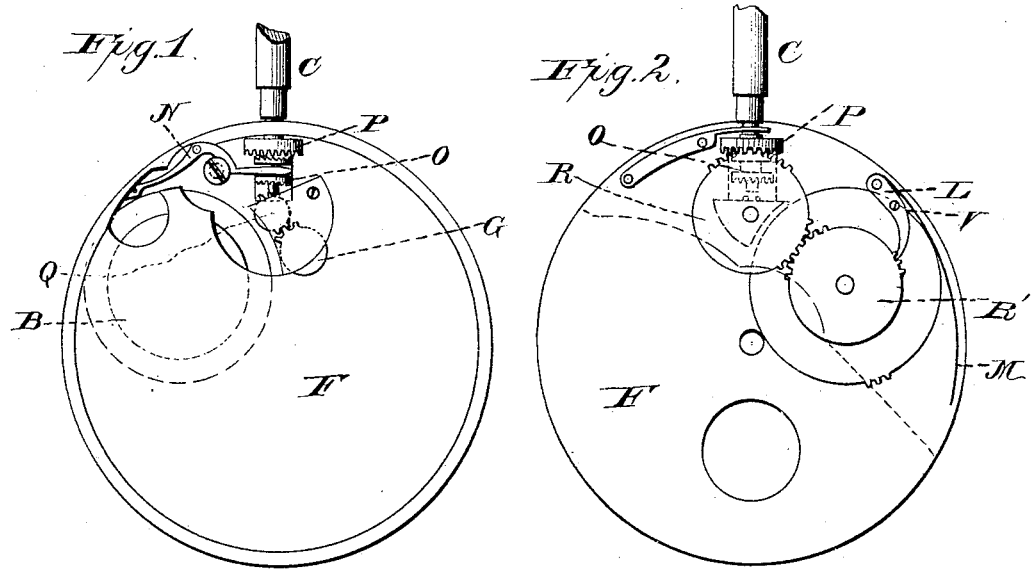
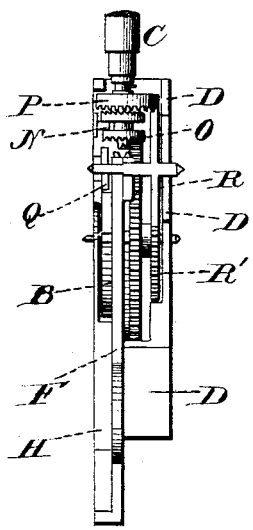
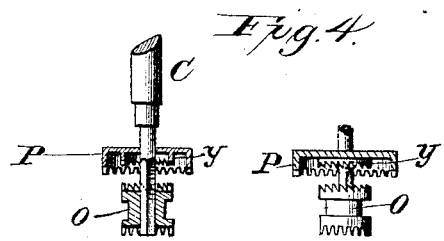
Witnesses:
Franck L. Ouraud
Penn Halsted
Inventor:
Paul Droz-Jeannot, fils,
by John J. Halsted
his Atty.

United States Patent Office.

PAUL DROZ-JEANNOT, FILS, OF BRENETS, NEUFCHATEL, SWITZERLAND.

STEM-WINDING WATCH.

SPECIFICATION forming part of Letters Patent No. 233,336, dated October 19, 1880.

Application filed March 12, 1880. (Model.) Patented in France May 16, 1877.

*To all whom it may concern:*

Be it known that I, PAUL DROZ-JEANNOT, Fils, of Brenets, in the canton of Neufchatel and Republic of Switzerland, have invented certain new and useful Improvements in Stem-Winding Watches; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has been patented in France and England—in France, 1877, in England, 1879.

Figure 1 shows one side, and Fig. 2 the opposite side, of a watch-works containing my invention; Fig. 3, an edge view, the frame being partly cut away, and Fig. 4, details, enlarged, The subject of my invention is a special system of stem-winding for watches, the construction of which is fully detailed below.

Both the wheels which are used to wind up the mainspring are supported by pivots, as shown in the drawings by R and R'. The wheel R works into the pinion P, adjusted on the stem or arbor C of the winding-shaft. The other wheel, R', gives motion to the barrel B, which is secured on and carried by the same arbor, said wheel forming the ratchet of the barrel-arbor B. Both these wheels have pivots at their extremities. (See section, Fig. 3.) These pivots work above in the same cock. or plate D, (shown by a dotted line in Fig. 2,) which makes sure the depths of the two wheels.

From below the pivots are kept in place as follows: The first wheel, R, called the "intermediate wheel," has its pivot or journal working in the frame itself, F. This frame supports, also, the connecting-wheel G, used for setting the hands. The second or other wheel, R', which is on the barrel-arbor, is kept in place from below by a cock, H, fastened under the frame, or in the frame itself when this is not sunk. The two wheels R and R' are made of steel, and may be made, wheel and arbor, of one piece, or in two, the wheels being in the latter case screwed or riveted on their respective arbors.

Under the cock D (see section, Fig. 3) are empty spaces reserved for the free action of the two wheels, sufficient thickness being left above for the pivots or journals. Between the ratchet and the barrel B is the center wheel, so that the wheels or ratchets are directly under the cock D and above the center wheel and the barrel B.

The wheel R', which is the ratchet of the barrel B, works with a click, L, whose spring M lies by its side and is sunk in the cock D. The click L works on pivots or journals between the cock and the frame F. To this click is fixed a screw, V, which projects above the cock D, and is used to free or undo the mainspring by lifting the click from the wheel R'. The pinion P, fixed on the arbor C of the winding-stem, works with the intermediate wheel R in order to wind up the mainspring, and may be set in different manners without interfering with the peculiarity of my system of keyless work. The pinion P is a crown-wheel, and within it, and connected to it, is another wheel, Y, having ratchet-teeth, the teeth of P, as before stated, being in engagement with wheel R, and the ratchet-teeth of Y being adapted to be engaged by the teeth on the upper edge of pinion O, the teeth on the lower edge of the same pinion O being adapted for engagement with the wheel Q for setting the hands.

Upon the prolongation of the pinion-stem is a click-work, (system Brequet,) kept in place by a spring, N. This same spring, when pressed upon from an outside button (not necessary to be shown) to set the hands, shifts the pinion O and connects it to the wheel Q, and consequently to the wheel G, above mentioned.

The wheels R and R' of the stem-winding apparatus being fixed upon their axes, and these axes resting upon their extremity or side pivots in the same bridge, prevents their displacement as well as their being disconnected, both in the act of winding and at all other times, and the greatest attainable stability is secured, and no effort or struggle of the person winding the watch is demanded, and the risk of accidents to this part of the watch in winding or handling is reduced to the minimum. In fact, it is exempt from the ordinary chances and accidents and wear incident to most stem-winders, and winds and unwinds with great facility. The manner in which these wheels R R' are made and are supported in their journal-bearings in the cock and plate, as described, gives them great freedom of movement, because of the very little friction they have to overcome, and their journals have no end pressure upon them, as must be the case where end screws are used to hold a wheel to place. All friction due to such screws I entirely avoid. Either one or the other of the pivots, in case of need, can be removed and replaced without damage to other parts.

My system of keyless work may be used for all sizes and all kinds of watches, open-faced or hunting-cases, no matter what may be the style of the work or the system of escapement—horizontal, lever, duplex, or detached escapement. The application of this system does not interfere in any way with the ordinary work of the watch, so the fourth wheel, with the second-hand, is at six o'clock on the same line with the pendant for the open-faced watches and at a right angle with the pendant for hunting-watches.

This system of keyless work may be used the same for watches with two barrels as independent center second, the intermediate wheel in such case being the same as mentioned above, the only difference being that both the barrels work in this intermediate wheel, and the pivots of both the arbors, as well as the one of the intermediate wheel, work in the same cock, and from below the intermediate wheel is supported by the frame, and both the barrel-arbors by a cock.

This system of keyless work may equally be used for repeaters, chronographs, chronometers, perpetual calendars with moon phases, full plate, three-quarter plate, or bar movements.

By my construction I dispense with most of or all the screws usually required in the mechanism of stem-winders. I also materially reduce the friction of the moving parts of the self-winder, particularly of the ratchets, by making them with relatively small pivots or journals, and which keep them from failing in their action, either on account of the want of or the thickening of the oil.

The pawl for keeping the spring-motor under tension insures the engagement of the parts by the great freedom given thereto, and the impossibility thereof to miss in its functions, pivoted as it is at each end and kept within its limits by the bridge of the self-winder and the plate.

By my improvements I produce a self-winder which is very soft in its action, and which, in a very unusual degree, defies wear and accident, and which will last at least as long as the other parts of the watch, while its simplicity renders it easy to take apart and to replace the parts.

I claim—

1. In a stem-winding watch, the wheels R R', each made integral with or firmly fixed upon its axis or arbor, such arbors being firmly supported at their extremities, respectively, as shown and described—namely, both of them above or at one side, in the same cock or plate D, and that of the intermediate wheel R at its other or lower side, in the frame F, and that of the wheel R' at its other side, in the frame or cock H, all as and for the purposes described.

2. In combination with the wheels R R', each fixed on its respective axle and supported or journaled in the cock D, frame F, and cock H, as shown and described, the pivoted spring-click L V M, pinion O, wheels P Y, and stem C, all constructed and operating as and for the purposes set forth.

PAUL DROZ-JEANNOT, Fils.

Witnesses:
JAMES HENRY,
    Watchmaker, Brenets, Switzerland.
PAUL ROBERT,
    Watchmaker, Brenets, Switzerland.